Sept. 21, 1926.

M. GROZNER

TIRE TOOL

Filed May 29, 1926  2 Sheets-Sheet 1

1,600,875

Inventor
Matyes Grozner.
By Bryant & Lowry
Attorneys

Sept. 21, 1926.  M. GROZNER  1,600,875
TIRE TOOL
Filed May 29, 1926   2 Sheets-Sheet 2

Inventor
Matyes Grozner.
By Bryant & Lowry
Attorneys

Patented Sept. 21, 1926.

1,600,875

UNITED STATES PATENT OFFICE.

MATYES GROZNER, OF SAN FRANCISCO, CALIFORNIA.

TIRE TOOL.

Application filed May 29, 1926. Serial No. 112,709.

This invention relates to certain new and useful improvements in tire tools and has for one of its objects to provide a tool adapted for clamping engagement with a split tire rim for expanding and contracting the rim at its split joint for the mounting and removal of a tire from the rim.

A further object of the invention is to provide a tire tool of the above type embodying a turn buckle mechanism to cause the opposite ends of the tool carrying rim engaging hooks to be moved either toward or away from the rim for expanding and contracting the same.

A still further object of the invention is to provide a tire tool of the turn buckle type wherein a cross head at each end of the tool carrying hooks for engagement with a split rim to contract the same is notched or grooved adjacent one end thereof for engagement with the usual annular bead on the inner face of the rim adjacent one side edge thereof with an outwardly directed arm or extension on the cross head cooperating with the adjacent sides of the wheel rim to maintain the tire tool in position thereon during expansion of the rim.

With the above and other objects in view that will become apparent as the nature of the invention is better understood, that same consists of the novel form, combination and arrangement of parts hereinafter more fully described, shown in the accompanying drawings and claimed.

Figure 1:
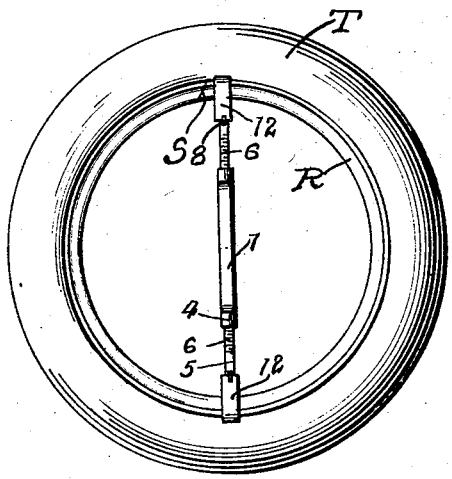
Figure 2:
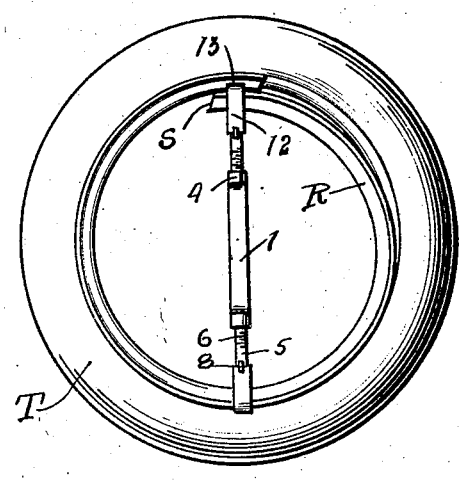
Figure 3:
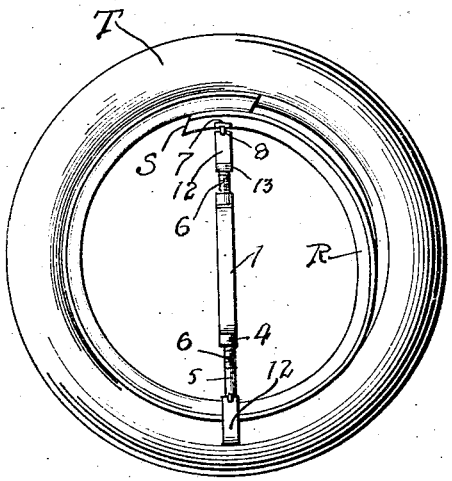
Figure 4:
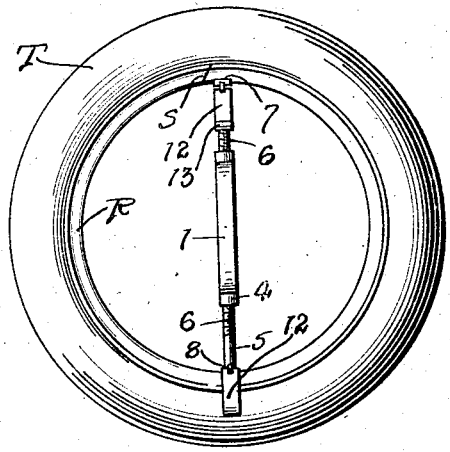
Figure 5:
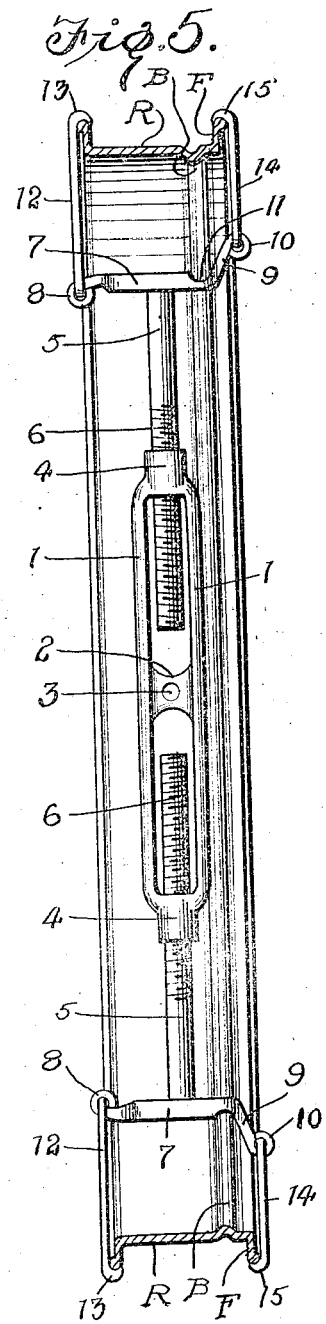
Figure 6:
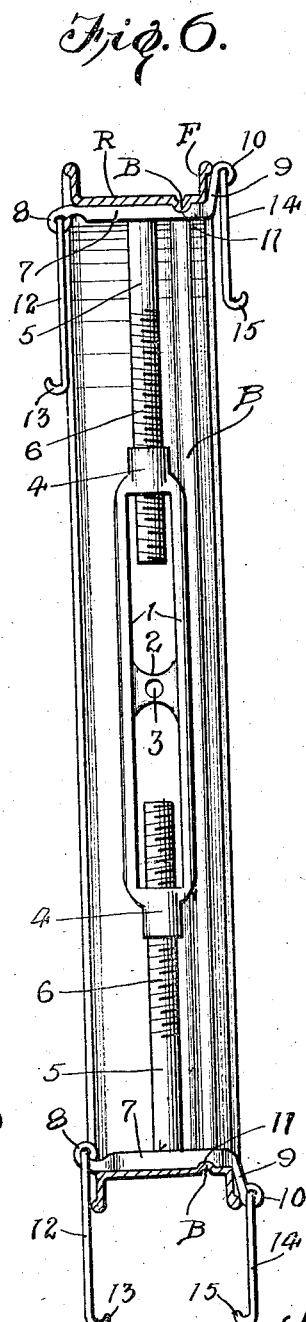
Figure 7:
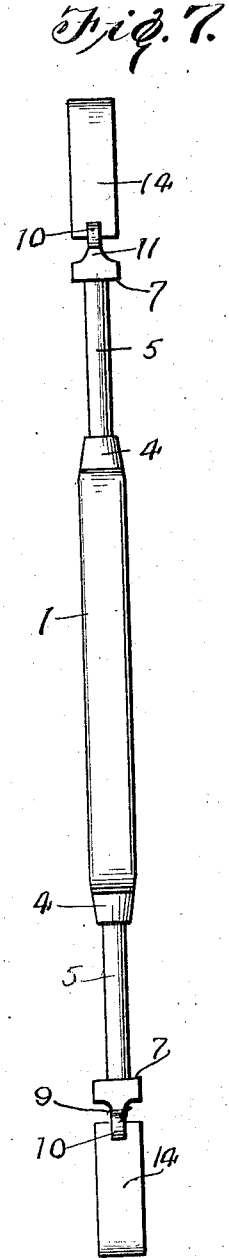

In the drawings, wherein like reference characters designate corresponding parts throughout the several views, Figure 1 is a side elevational view of an automobile tire mounted upon a split rim with the improved tire tool in position thereon prior to operation for contracting the split rim, Figure 2 is a similar side elevational view showing the tire tool operated and with the split rim contracted, Figure 3 is a similar side elevational view showing the tire tool in position with the rim engaging hooks disengaged and with the cross head carrying the hooks engaging the inner split end of the rim prior to operation thereof for expanding the rim, Figure 4 is a similar side elevational view showing the split rim fully expanded with the split ends thereof in engagement, Figure 5 is a vertical cross-sectional view of a wheel rim with the tire tool in position thereon having the rim engaging hooks operating for contracting the rim, Figure 6 is a vertical cross-sectional view of a wheel rim with the tire tool in position having the cross head carrying the hooks directly engaged with the wheel rim for expanding the same and showing the outwardly offset arm or extension on the cross head with the groove therein receiving the annular bead upon the wheel rim, and Figure 7 is an edge elevational view of the tire tool.

As shown more clearly in Figs. 5 and 6 the tire tool being of a turn buckle construction that comprises a link having side bars 1 connected intermediate their ends by a bridge piece 2 having an opening 3 therein for purposes presently to appear, the screw bolt bearings 4 at each end of the link being oppositely threaded in the usual manner. A bolt 5 threaded at its inner end as at 6 is engaged in the threaded bearing 4 at the respective ends of the turn buckle and each screw bolt 5 carries a cross head 7 at its outer end.

The cross head 7 being of a length substantially coincident to the width of an ordinary split rim R is bent at one of its ends to form an eye 8 substantially alined therewith while the other end of the cross head 7 carries an outwardly offset angular arm extension 9 having an eye 10 at its free end. The outer side of each cross head 7 in proximity of the extension arm 9 is formed with a groove 11 for cooperation with the annular bead B formed on the inner face of the rim R adjacent the side flange F. A hook 12 is pivotally supported at one end upon the eye 8 at one end of the cross head 7 and has a hook end 13 formed at its outer end, a relatively shorter hook 14 being pivotally supported upon the eye 10 of the extension arm 9 and having a hook end 15 at its outer end with the ends 13 and 15 extending in the same transverse plane when the hooks 12 and 14 are disposed parallel with each other to present the hook ends 13 and 15 in proper position for engagement with the rim flanges F.

As shown in Fig. 1, the tire tool is mounted upon the rim R and it being desired to remove the tire T from the rim the hooks 12 and 14 are mounted on the rim substantially with respect to the split ends S thereof and upon operating the turn buckle by placing a rod through the opening 3 in the bridge piece 2 to thread the screw bolt 5 into the turn buckle link the split ends S of the rim are broken and moved to the position shown in Fig. 2 and at which time the tire T may be readily removed.

In replacing the tire T upon the rim after the same has been collapsed as shown in Fig. 3, the tire tool is located upon the rim with the cross heads 7 thereof directly engaging the inner face of the rim and with the hooks 12 and 14 laterally displaced. When the tire tool is so disposed, the groove 11 in the outer face of the cross head engages the rib B upon the inner face of the rim while the angularly offset arm 9 engages the outer side of the flange F to form a substantially interlocking connection between the tire tool and rim and to prevent accidental displacement of the tool with respect to the rim. Upon rotating the link of the turn buckle in the opposite direction, the screw bolts are moved outwardly and the separated or split ends S of the rim are moved to the mating position shown in Fig. 4, and at which time the usual retaining means for the split ends may be operated to retain the rim in this position.

While there is herein shown and described the preferred embodiment of the present invention, it is nevertheless to be understood that minor changes may be made therein without departing from the spirit and scope of the invention as claimed.

What is claimed is:—

In a tire tool, means for expanding and contracting a split rim including a turn buckle link, screw bolts working therein, a cross head at the outer end of each bolt and a rim engaging hook pivoted to each end of the cross head and disposed substantially parallel when the tool is contracting a rim, an outwardly offset angular extension arm carried by one end of the head and adapted for contacting a side flange of a tire rim during expanding movement of the rim, one of said engaging hooks being attached to the extension arm and of shorter length than the other hook with the outer hook ends of the hooks lying in the same transverse plane.

In testimony whereof I affix my signature.

MATYES GROZNER.